United States Patent [19]

Hatakeyama et al.

[11] Patent Number: 4,757,302
[45] Date of Patent: Jul. 12, 1988

[54] IMAGE DISPLAY APPARATUS

[75] Inventors: Atsushi Hatakeyama, Kokubunji; Hiromichi Fujisawa, Tokorozawa; Masaaki Fujinawa, Tokyo, all of Japan

[73] Assignee: Hitachi, Ltd., Tokyo, Japan

[21] Appl. No.: 919,460

[22] Filed: Oct. 16, 1986

[30] Foreign Application Priority Data

Oct. 16, 1985 [JP] Japan ................. 60-228673

[51] Int. Cl.$^4$ .................. G08B 3/00; G09G 3/02
[52] U.S. Cl. ........................... 340/407; 340/710; 340/723; 340/798
[58] Field of Search ........... 340/407, 710, 718, 723, 340/798, 799, 309.15, 309.3; 364/188–190, 419; 369/19, 20, 22; /APS MS File

[56] References Cited

U.S. PATENT DOCUMENTS 3,541,541 11/1970 Engelbart ............... 340/720
4,561,049 12/1985 Deleganes et al. ......... 340/710
4,602,251 7/1986 Sawada et al. ............. 340/798
4,604,615 8/1986 Funahashi ................. 340/798

OTHER PUBLICATIONS

"A Prototype System for the Electronic Storage and Retrieval of Document Images", G. R. Thomas, et al., vol. 3, No. 3, 7-1985.
"Characteristics of a Transducer for Tactile Displays", G. F. Shannon, Biomedical Engineering, vol. 9, No. 6, 6-1974.

Primary Examiner—Donnie L. Crosland
Attorney, Agent, or Firm—Antonelli, Terry & Wands

[57] ABSTRACT

An image display apparatus that can ease the man-machine interaction when a user searches for a document in an electronic filing system, for example, through the image display apparatus. In a conventional electronic document filing system, it has been difficult to search for a document by inspecting or looking at the original document images shown on an image display screen. The difficulty comes from the lack in a capability of controlling the instantaneous display speed, an appropriate feedback to the user to synchronize the image paging, and a capability of showing the direction of paging. The image display apparatus disclosed here has a tactile feedback mechanism that tells the user the time a new image page is shown and that also tells him/her other status of the apparatus, like how busy it is, in terms of a tactile signal to the user's fingers. The mechanism is installed in a mouse-like pointing device that tells the apparatus the speed of paging. By using this, the user can control the paging speed spontaneously and at the same time he/she can feel the paging through the tactile feedback, in addition to a kind of sound effect.

7 Claims, 12 Drawing Sheets

FIG. 2

| IDENTIFICATION NUMBER | START ADDRESS | DISPLAY LINE POSITION |
|---|---|---|
| P008 | E100 | 0 |
| P009 | E200 | 0 |
| P010 | E300 | 0 |
| P030 | E400 | 0 |
| P031 | E500 | 0 |
| P032 | E600 | 0 |
| P033 | E700 | 0 |
| P034 | E800 | 0 |
| P051 | E900 | 0 |
| P052 | EA00 | 0 |

FIG. 8

| IDENTIFICATION NUMBER | START ADDRESS | DISPLAY LINE POSITION |
|---|---|---|
| P008 | E100 | 600 |
| P009 | E200 | 600 |
| P010 | E300 | 500 |
| P030 | E400 | 400 |
| P031 | E500 | 400 |
| P032 | E600 | 380 |
| P033 | E700 | 320 |
| P034 | E800 | 0 |
| P051 | E900 | 0 |
| P052 | EA00 | 0 |

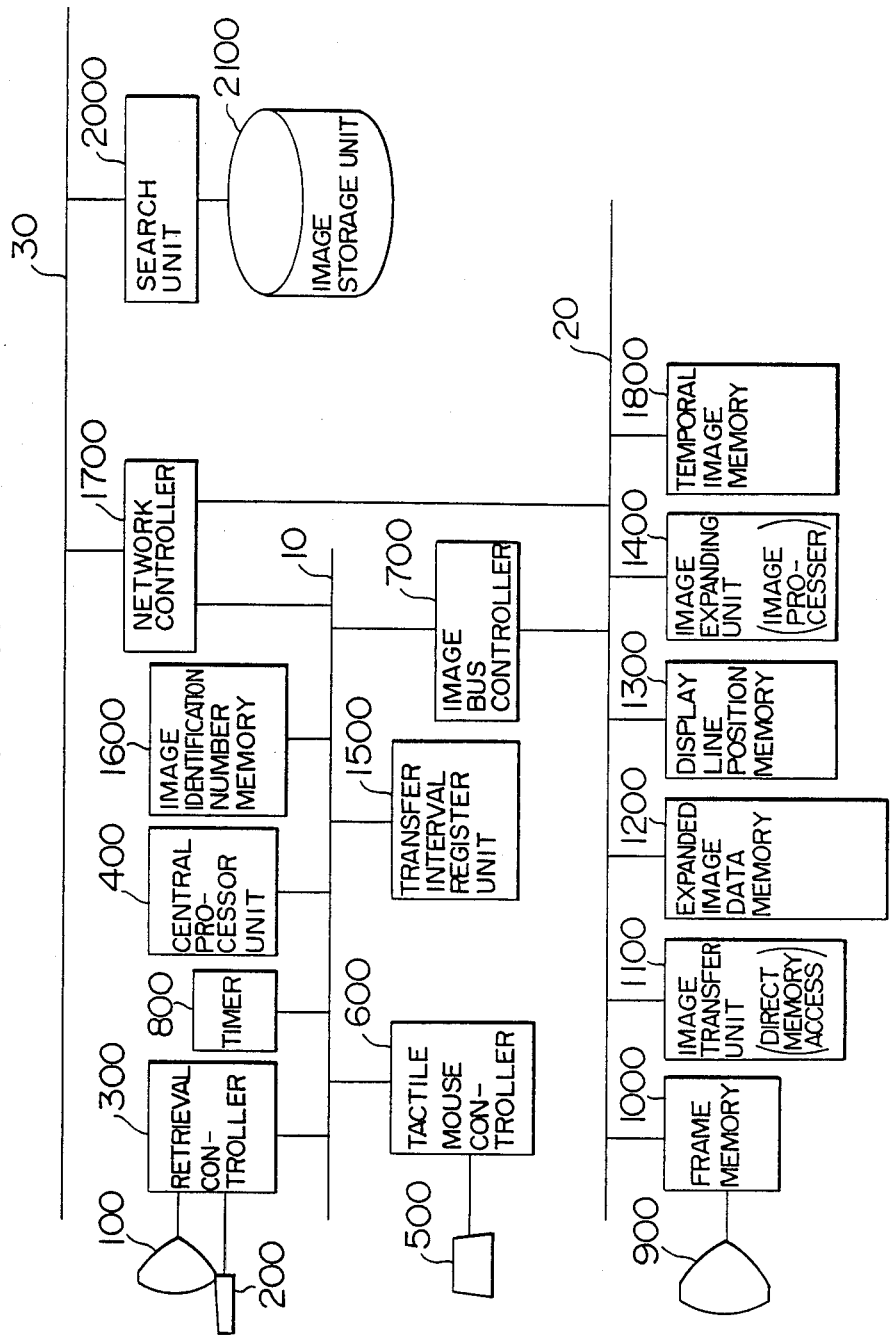

IMAGE DISPLAY APPARATUS

BACKGROUND OF THE INVENTION

The present invention relates to an apparatus for displaying a plurality of document images, and more particularly to an image display apparatus which allows, when a user searches a desired image while he/she is visually checking a number of images one by one, to sequentially display less pertinent images quickly and display more pertinent images slowly one by one.

In the past, information on papers which can be visually recognized have been stored collectively for future reference. When such information is to be retrieved, the stored information is retrieved document by document and the desired information is visually searched page by page. For example, in an office, various types of documents may be classified into files each containing 100–400 sheets. When information is to be retrieved, one of the files is taken out and the contents thereof are visually checked page by page to retrieve the desired document. Similar procedures are taken when desired information is to be retrieved from books or dictionaries. In checking the content of the real papers while manually paging the file, the speed of paging may be determined by the worker who actually pages the file. The worker does not carelessly look at the content of the document but recognizes the content of the document in synchronism with the paging.

Recently, as the volume of documents increases, it is difficult from a standpoint of storage space to store the documents in the form of paper. Methods for storing the information in a more compact manner than storing in the form of paper include a microfilming method and an electronic filing method by using magnetic disks or optical disks with computer processing as shown in "A prototype System for Electronic Storage and Retrieval of Document Images", ACM Transactions on Office Information Systems, Vol. 3, No. 3, 1985, pages 279-291. Since the documents stored in the microfilms or optical disks cannot be read by the naked eye, special display apparatus is required. The display apparatus has a function (paging function) for sequentially displaying a plurality of images so that a user can check the content page by page.

In a currently available microfilm display apparatus for a rolled film, continuous and variable speed paging can be performed. Although a user can set a speed at which the film is mechanically wound to attain continuous paging, the image flows on the display screen because of the mechanism to mechanically wind the film, and it is difficult for the user to visually check the content. Further, in the continuous paging, there is no means to indicate the boundary of pages to the user and it is difficult for the user to check the content of each page.

In backward paging using the microfilm display apparatus, the user can recognize that the film is moving backward. However, in an electronic filing system, the backward paging is performed in the same manner as forward paging and the user cannot recognize visually whether the paging is being done forward or backward.

In the paper storing system, documents are collectively stored in one place and a plurality of users search for desired documents from the collectively stored documents. This method is adopted in the electronic file display apparatus. Image data of documents are collectively stored in a central storage unit and a plurality of image display apparatus are provided to allow simultaneous retrieval of documents by a plurality of users. A plurality of users may simultaneously access the central storage unit. As the result, a waiting time from the issuance of a command for image display by the user to the actual image display may be longer than when the unit is used by one user. There has been no solution for the delay of response time when a plurality of users simultaneously access the storage unit. And there has been no means to indicate to the user that the response time will be longer than that when the unit is occupied by one user.

The problems encountered in the electronic file and the microfilm display apparatus, compared to the paper storage system, are summarized below.

(1) Since the paging is done by the display apparatus, the user has no real feeling of paging and it is difficult to check the content of each page.

(2) Even when a plurality of users simultaneously use the image storage unit, the users expect the same response time as that when the image storage unit is occupied by one user because the users are not informed that other users are using the same storage unit. As a result, the users have to wait for the display of a desired image.

(3) In the electronic file display apparatus, the displays in the forward paging and the backward paging are performed in the same manner. Accordingly, the user cannot readily recognize whether the paging is forward or backward.

(4) In the rolled film display apparatus, the user can readily recognize the direction of paging but it is difficult for the user to recognize the content because the image flows on the display screen.

SUMMARY OF THE INVENTION

It is an objective of the present invention to provide an apparatus for easily and efficiently searching a desired document by paging images contained in microfilms or electronic files in the same manner as documents contained in paper sheets are manually paged.

In order to achieve the above object, in accordance with the present invention, means is provided having a function of user's designation of a continuous display speed of a plurality of images, a function of supplying to the user a signal synchronized with the image display of each page, and a function of informing to the user that the image display more will be delayed than usual when a plurality of users simultaneously access the same image display apparatus or for another reason.

This means is a man-machine interactive means using a tactile signal, which has a mechanism for adjusting the paging speed and which is directly used as a mechanism to convey the machine response to the user. In other words, it is the interactive means having a tactile feedback.

Another objective of this invention is the following. In this invention, a random access buffer memory is provided between an image storage unit and a frame memory so that even during the checking of the image by the user, the image data to be next displayed are sequentially fetched from the storage unit to the buffer memory to allow high speed paging. If a display time per page (display interval) designated by the user is shorter than a time required to display one screen, the display of that page is terminated midway and the next page is displayed so that the paging is done at a higher speed.

BRIEF DESCRIPTION OF THE DRAWINGS

FIG. 2 shows a configuration of a display line position memory,

FIG. 8 shows a configuration of the display line position memory,

FIG. 15 shows a block diagram of a second embodiment of the present invention.

DESCRIPTION OF THE PREFERRED EMBODIMENTS

One embodiment of the present invention is now explained in detail.

Figure 1:
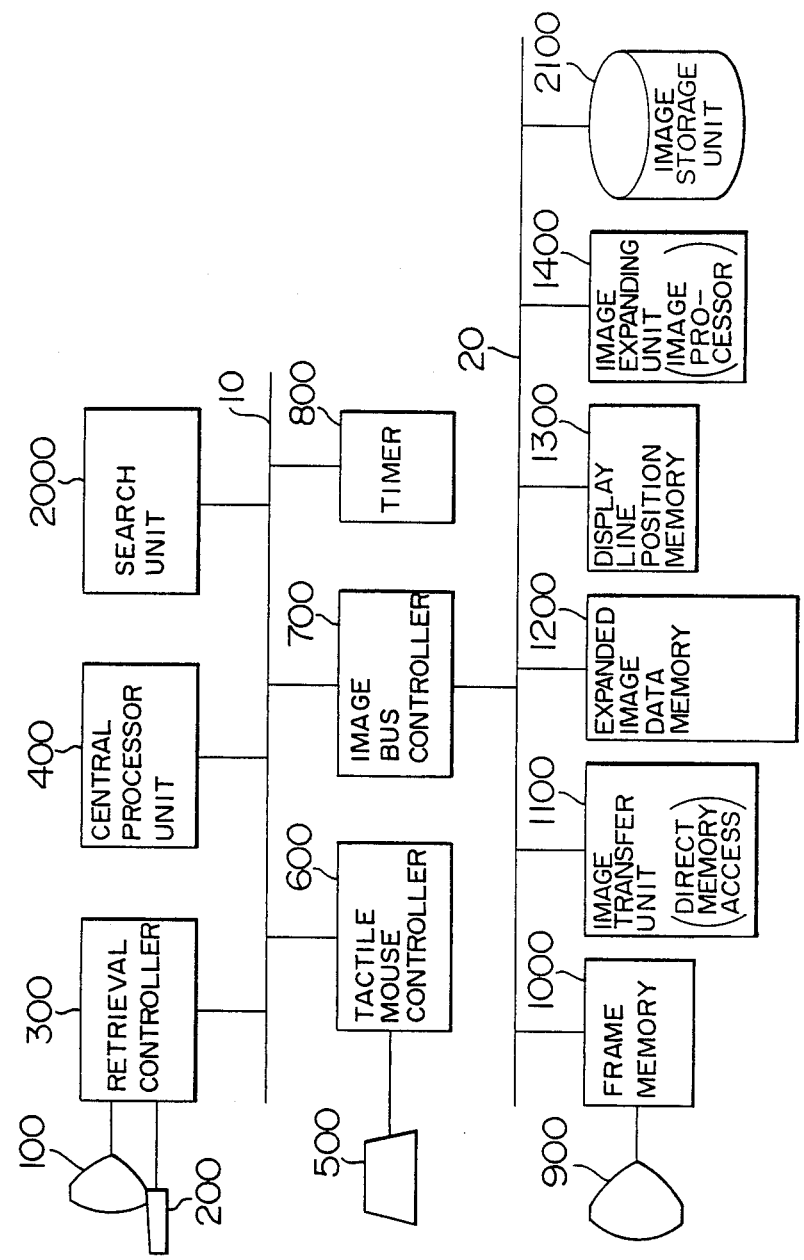
FIG. 1 is a block diagram of one embodiment of the present invention.

FIG. 1 shows a block diagram of one embodiment of an image display apparatus of the present invention. The apparatus comprises a control bus 10, an image bus 20, a retrieval information display 100, a keyboard 200, a retrieval controller 300, a central processor unit 400, a tactile mouse 500, a tactile mouse controller 600, an image bus controller 700, a timer 800, an image display unit 900, a frame memory 1000, an image transfer unit 1100, an expanded image data memory 1200, a display line position memory 1300, an image expanding unit 1400, a search unit 2000 and an image storage unit 2100.

The tactile mouse 500 is a characteristic feature of the present invention. It has a function of a pointing device to point on a screen, a function of adjusting a display interval for paging and a function of informing the user of end of display of the one page.

An overall flow of processing is explained with reference to FIG. 1. An image to be displayed is selected by using keyboard 200 or the tactile mouse 500 in accordance with the content displayed on the retrieval information display 100. A plurality of images may be designated. An image identification number corresponding to the designated image is searched for by the search unit 2000. The central processor unit 400 sends an instruction through the image bus controller 700 to retrieve the image of the image identification number into the image expanding unit 1400. The image expanding unit 1400 retrieves the compressed image data of the image identification number from the image storage unit 2100 and expands it to the original non-compressed image, which is transferred to the expanded image data memory 1200. A start address of a data destination of the expanded image data memory 1200 is written into a start address field of the display line position memory 1300 and an initial value "0" is written into a display line position field of the memory 1300. FIG. 2 shows a content of the display line position memory 1300 before paging.

The tactile mouse controller 600 is used as a conventional pointing device to point on the display screen as well as to designate, in real time, a time interval for seeing the displayed images and indicate the end of one-page display by a tactile signal. The user can designate the forward or backward paging and the display interval by use of the tactile mouse. The central processor unit 400 sends an instruction to sequentially display the images to the image transfer unit 1100 while it monitors the display interval designated by the tactile mouse and the display elapsed time indicated by the timer 800. The image transfer unit 1100 responds to the instruction from the central processor unit 400 to transfer the content of the expanded image data memory 1200 to the frame memory 1000. The image display unit 900 continuously displays the content of the frame memory 1000.

Figure 3:
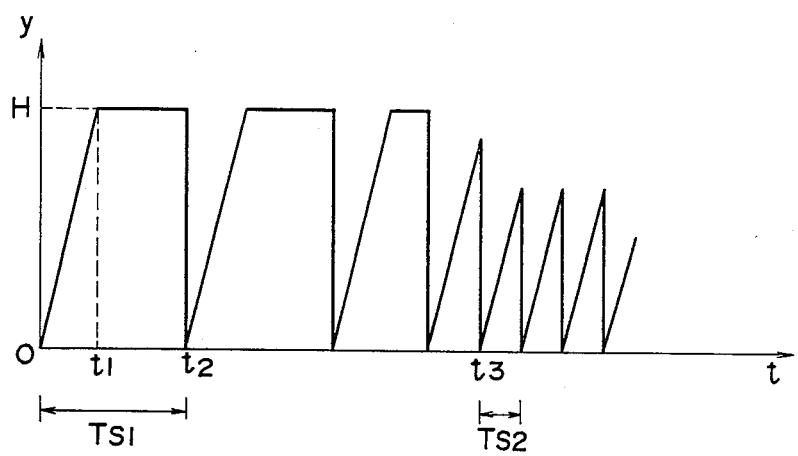
FIG. 3 shows movement of a display line position in forward paging.

The manner of paging when a raster type display unit is used is explained with reference to FIG. 3. The ordinate y in FIG. 3 shows a position of the last display line (raster line) of the newest page being displayed. When y=H, an entire image is displayed on the screen. The abscissa t represents elapsed time. For example, when the designated display interval is $T_{S1}$ and the paging is started at t=0, the display of the entire image is completed at a time $t_1$, but since the interval $T_{S1}$ has not yet been elapsed, the image remains displayed until a time $t_2$. When the interval $T_{S1}$ has elapsed and the time $t_2$ is reached, the display of a second image is started. If the display interval is changed to $T_{S2}$ at a time $t_3$, the time required to display the entire image is longer than $T_{S2}$ so the image display is terminated midway and the display of the next image is started.

Figure 4:
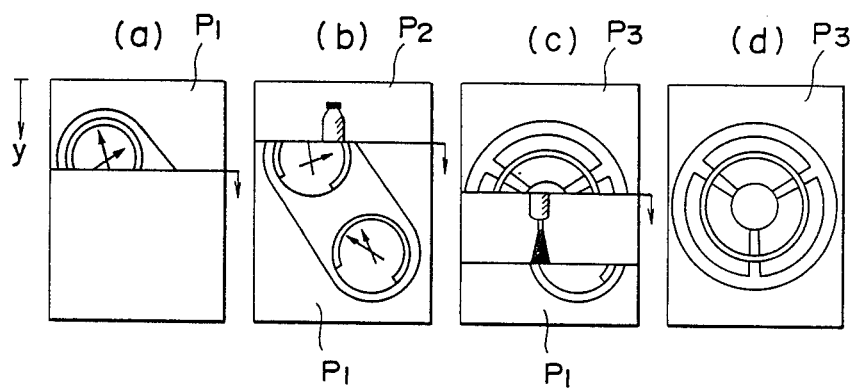
FIG. 4 shows a display screen in the forward paging.
Figure 5:
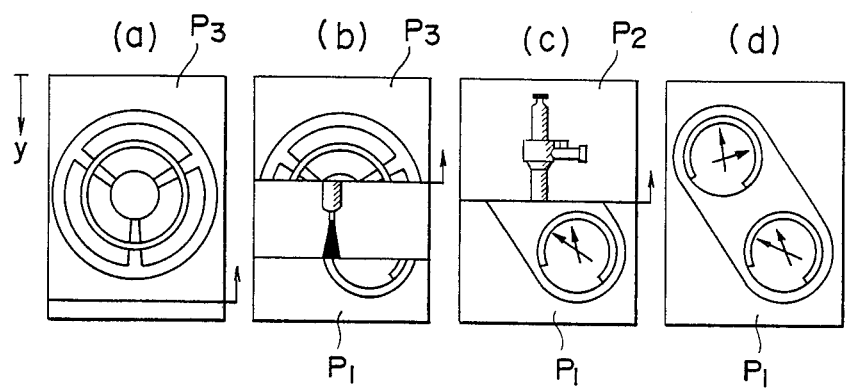
FIG. 5 shows a display screen in backward paging.
Figure 6:
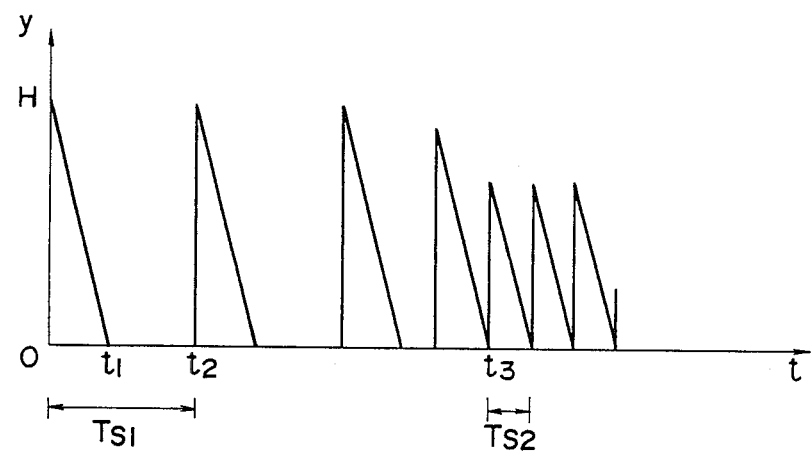
FIG. 6 shows movement of the display line position in the backward paging.

In the backward paging (FIG. 5), it is devised to give the feeling of reversed time compared to the forward paging (FIG. 4). In FIGS. 4 and 5, P1, P2 and P3 denote page numbers of the image. In the forward paging, the image is displayed in the order of P1, P2 and P3, and in the backward paging, the image is displayed in the order of P3, P2 and P1. FIG. 4(a) shows a manner in which P1 is being displayed, FIG. 4(b) shows a manner in which P1 has been displayed and P2 is being displayed, FIG. 4(c) shows a manner in which the display of P2 has been terminated in the midway and P3 is being displayed, and FIG. 4(d) shows a manner in which the display of P3 has been completed. FIG. 6 shows a chart corresponding to that of FIG. 3 for the backward paging.

Figure 7:
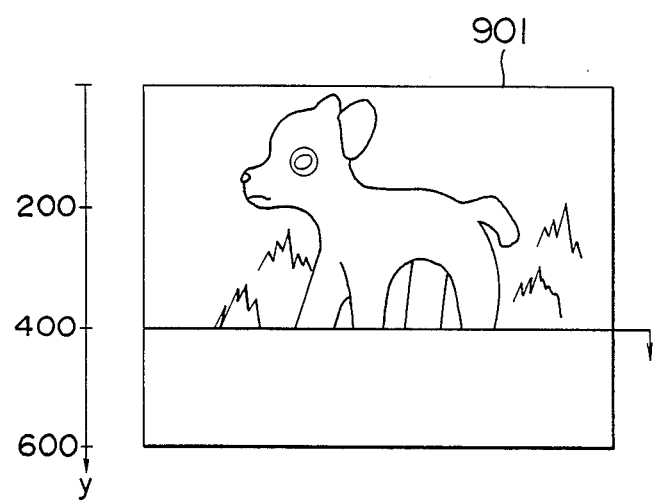
FIG. 7 shows the definition of the display line position.

As shown in FIGS. 4 and 5, in the present apparatus, the display of one-page image is terminated midway and the next image is displayed depending on the designated display interval, and in the backward paging, the display is done in the time reversal manner compared to the display in the forward paging. The display interval is defined as a time interval from the start of display of page N image to the start of display of page (N+1) image in the paging mode. In order to achieve it, the display line position memory 1200 is provided. In the forward paging, each time one-page image display is completed or terminated midway, the position of display (display line position) completed in one-page image is stored in the display line position memory together with the image identification number. The display line position is defined as the number given by the line position y of the pixels. For example an image display screen 901 of FIG. 7 displays one-page image and the image is displayed as a matrix of pixels. In FIG. 7, one-page image consists of 600 lines of pixels. It shows that the display in the forward paging mode has been completed to the line position of y=400.

FIG. 8 shows a content of the display line position memory 1300 in the paging mode. P008 indicates that the display line position is 600, that is, the entire image has been displayed, and P033 indicates that the display line position is 320, that is, the display is terminated midway. P034 indicates that the display line position is 0 and the image has not yet been displayed.

A flow of processing in accordance with the present invention is now explained in further detail.

Figure 9:
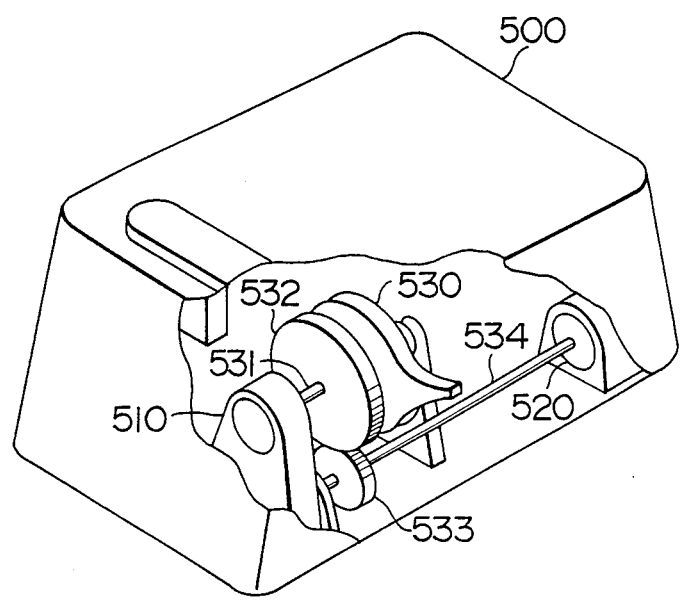
FIG. 9 shows a tactile mouse.

FIG. 9 shows the tactile mouse 500. Elements to achieve the function of designating the display interval and indicating the end of one-page display by the tactile signal comprise a potentiometer 510, a torque motor 520, a lever 530 and shafts 531 and 534 and gears 532 and 533 for coupling the above elements.

The display interval is designated in the following manner. The lever 530 is manipulated by the user and a rotation angle $\theta$ of the lever 530 determines the display interval. The rotation of the lever 530 is transmitted to the potentiometer 510 through the shaft 531, and the tactile mouse controller 600 reads a deviation $\theta$ from an equilibrium point to determine the display interval $T_S$.

Figure 10:
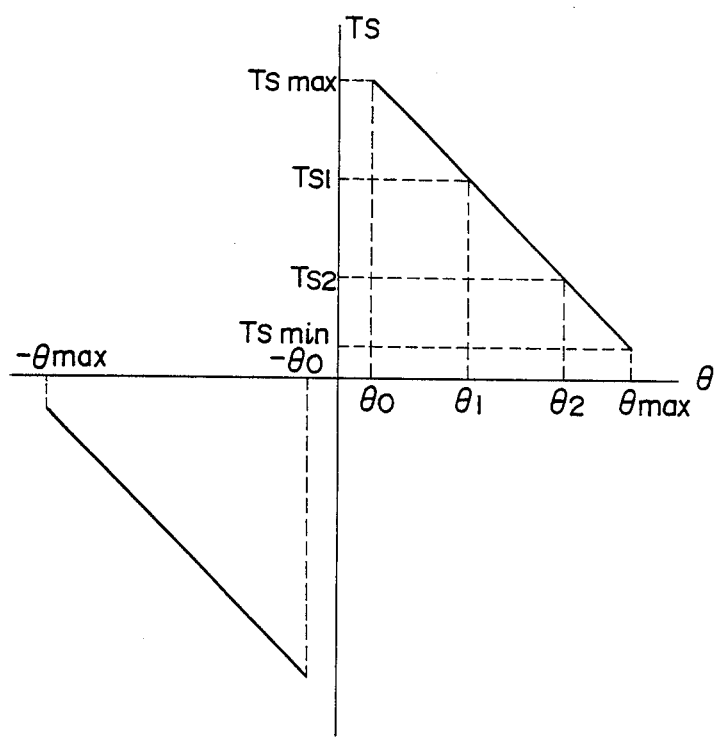
FIG. 10 shows a relationship between a lever rotation angle and a display interval.

FIG. 10 shows the relationship between the diviation $\theta$ and the display interval $T_S$. An absolute value of $T_S$ represents an actual display interval. $T_S=0$ indicates that the paging is not carried out. When $-\theta_0<\theta<\theta_0$, the display interval $T_S=0$ and the paging is not carried out. The deviation $\theta$ ranges between $-\theta max$ and $\theta max$. When $\theta$ is negative, backward paging is carried out, and when $\theta$ is positive, forward paging is carried out. As the absolute value of $\theta$ increases, the paging speed increases. The tactile mouse controller 600 has a register A (not shown) in which the display interval designated by the deviation $\theta$ is written. For forward paging, a positive value is written, and for backward paging, a negative value is written.

Figure 11:
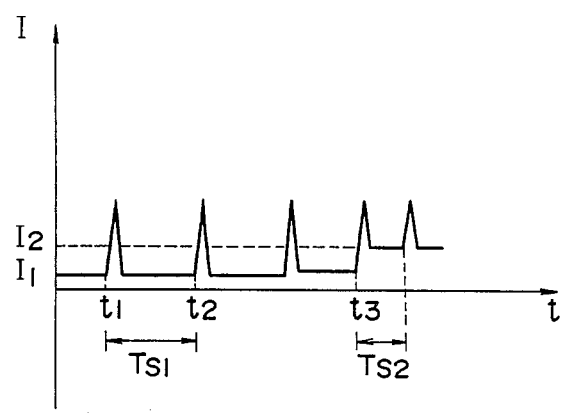
FIG. 11 shows a current supplied to a torque motor in the forward paging.
Figure 12:
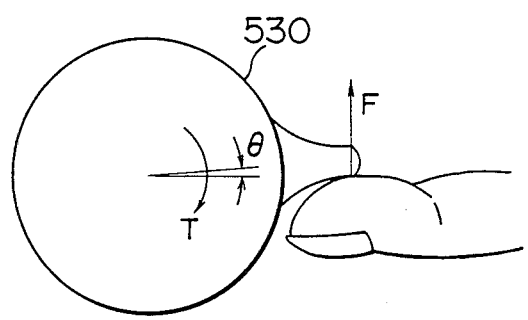
FIG. 12 shows a relationship between a torque applied to the lever and a force applied by a user.
Figure 13:
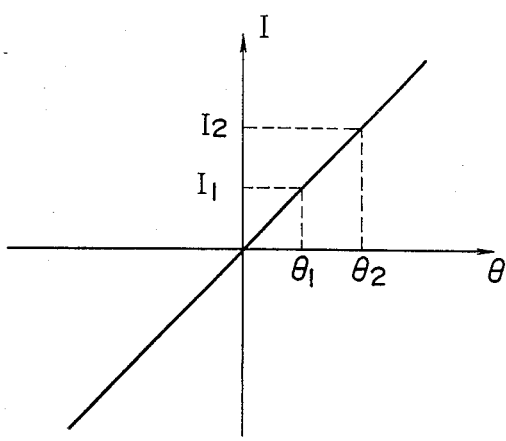
FIG. 13 shows a relationship between the lever rotation angle and a bias current supplied to the torque motor.

The tactile transmission of the signal indicating the end of one-page display is carried out in the following manner. The torque motor 520 in FIG. 9 varies the direction and magnitude of the torque to be transmitted to the lever 530 depending on the polarity and magnitude of the input current. The tactile mouse controller 600 responds to the signal sent from the central processor unit 400 for each output of one-page image to generate a pulse current, which is supplied to the torque motor 520 so that the boundary of the page is indicated to the user who manipulates the lever 530, as a slight change in the torque. FIG. 11 shows a change of the current supplied to the torque motor 520 in the forward paging mode. In FIG. 11, $t_1$, $t_2$ and $t_3$ indicate times at which display of images terminates. The tactile mouse controller 600 generates the pulse current which is the signal for indicating the end of one-page display as well as a bias current for the torque which tends to return the lever 530 to the equilibrium point as shown in FIG. 12. FIG. 13 shows a relationship between the rotation angle $\theta$ of the lever 530 and the bias current I. The polarities of the pulse current and the bias current are selected such that the torque is applied in a direction to return the lever 530 to the equilibrium point. In the backward paging, the polarities of the currents shown in FIG. 11 are reversed. In the present embodiment, the torque is used as the tactile signal although pressure or vibration may be used instead.

Figure 14:
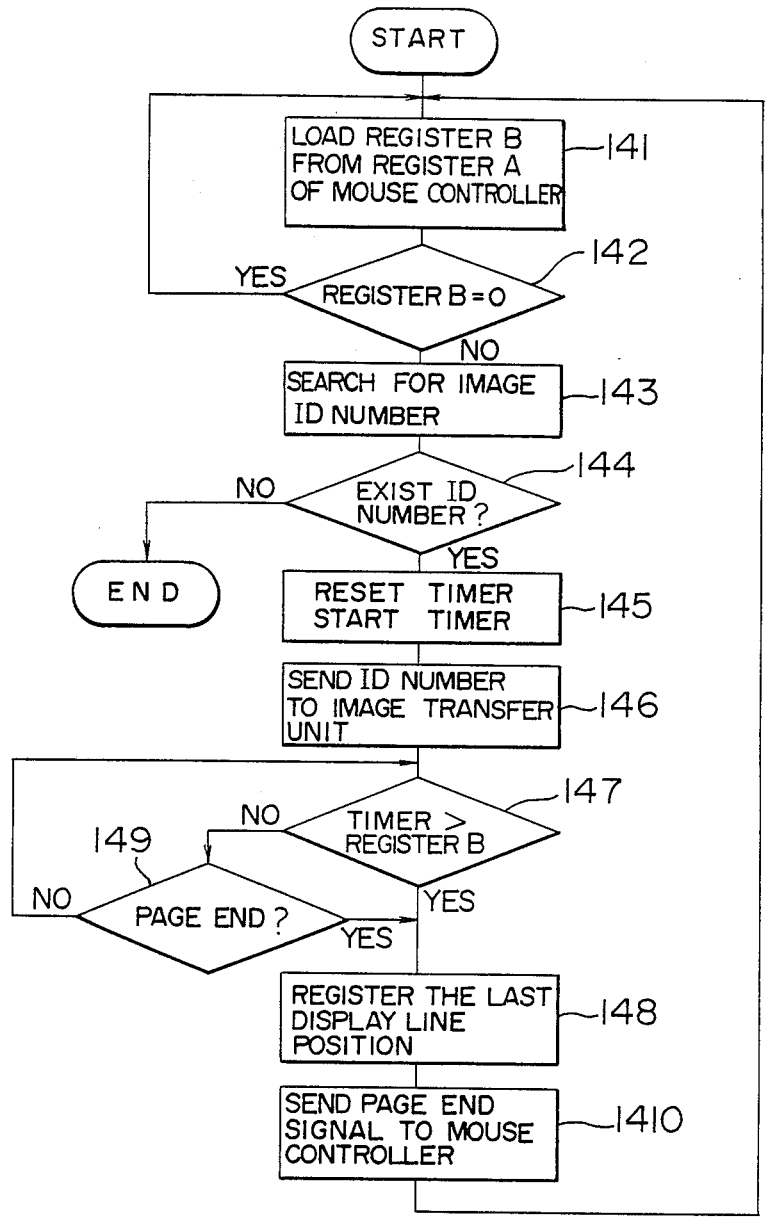
FIG. 14 is a flow chart showing processing by a central processor unit.

A flow of processing in the forward paging is explained with reference to FIG. 14. After the central processor unit 400 has sent an image data transfer instruction, it fetches (141) the content of the register A of the tactile mouse controller 600 indicating the display interval into a register B of the central processor unit. If the content of the register B is not 0 (142), the central processor unit 400 fetches data from the display line position memory 1300 and searches (143) for the image number of the image to be next displayed. In the display line position memory 1300, the image identification number of the currently displayed image is the rearmost data other than the display line position 0 (P033 in FIG. 8). Thus, the image identification number searched for is the next image identification number (P034 in FIG. 8). If there is a corresponding image number (144), the central control unit 400 resets (145) the timer 800 and sends (146) an instruction to the image transfer unit 1100 to transfer one-page image data to the frame memory. While the image data is sent from the expanded image data memory 1200 to the display image memory 1000, the central processor unit 400 continuously compares the content of the timer with the content of the register B which represents the display interval. If the content of the timer is larger (147) than the designated timer interval or the content of the register B, the central processor unit 400 issues a termination instruction to the image transfer unit 1100 to terminate the transfer of the image data midway. When the image transfer unit 1100 receives the termination instruction, it writes into the display line position memory 1200 the line position up to which the display has been completed and stops the processing (148). If the termination instruction is not received, the image transfer unit 1100 sends (149) an end of transfer signal to the central processor unit 400 at the end of the transfer of one-page image data and writes into the display line position memory 1200 the line position up to which the display has been completed. When the content of the timer 800 exceeds the content of the register B or the image transfer unit 1100 generates the end of transfer signal, the central processor unit 400 sends (1410) an end of one-page display signal to the tactile mouse controller 600.

In the backward paging, the display line position memory 1300 is referenced and the display is made from the stored last display line position in the previous run upwardly on the screen shown in FIG. 3. This operation is illustrated in FIG. 4. When the time elapses from t=0 to t=t$_1$, the value of the line position y decreases. The backward paging is now specifically explained. FIG. 8 shows a content of the display line position memory 1300 when the forward display has been terminated up to the image identification number P033. It is assumed that the lever 530 is now thrown to the opposite position to start the backward paging. The tactile mouse controller 600 writes the value $T_S$ representing the rotation angle of the lever 530 into the register A in accordance with the relationship of FIG. 10. The central processor unit 400 searches for an image identification number one smaller than that of the currently displayed image. The image is displayed from the current line position to the top of the display. The image data is sent from the expanded image data memory 1100 to the frame memory 1000. At P033 in FIG. 8, since the display up to the line position y=320 has been completed, the data of P032 displayed in the previous cycle from an address 320 lines behind of E600 to E600 are sent to the corresponding area in the frame memory 1000. When P032 has been displayed, the line position of the last record (P033, E700, 320) in the display line position memory 1300 is reset to (P033, E700, 0). Since P032 has been displayed up to y=380 in the forward paging mode, the image data of P031 is sent starting from the position y=380. In this manner, the backward display is conducted while referencing and updating the data in the display line position memory 1300. In order to obtain data of the image of any image identification number displayed in the past, the random access expanded image data memory 1200 and the image transfer unit 1100 having the forward and backward transfer function are provided.

A second embodiment of the present invention is now explained. FIG. 15 shows a block diagram of the second embodiment. A difference from the first embodiment resides in an transfer interval register unit 1500, an image identification number memory 1600, a network controller 1700 and a temporary image memory 1800. A search unit 2000 and an image storage unit 2100 are connected through a network 30 to allow use by a plurality of users. The central processor unit 400 sends the designated image identification number to the search unit 2000 through the network controller 1700. The image data is sent to the temporary image memory 1800 through the network controller 1700 together with the image identification number. The image expanding unit 1400 fetches the compressed image data from the temporary image memory 1800 and sends the expanded image data to the expanded image data memory 1200. The transfer interval register unit 1500 has a register C and changes the content of the register C each time the image data is sent from the network controller 1600. The transfer interval register unit 1500 loads to the register C the transfer interval per page of the image data sent from the network. The image identification number memory 1600 stores all identification numbers of the image to be received. When the image data to be displayed is exhausted in the expanded image data memory 1200, the central processor unit 400 sends the content of the register C of the transfer interval register unit 1500 to the tactile mouse controller 600 if the next image identification number to the currently displayed image has been written into the image identification number memory 1600. The tactile mouse controller 600 supplies a current to the torque motor 520 to return the lever 530 to the angle $\theta$ corresponding to the sent value.

Figure 16:
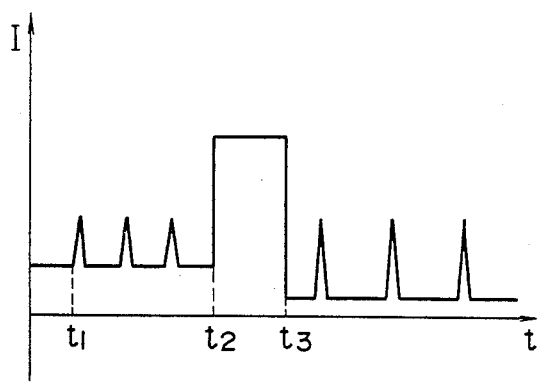
FIG. 16 shows a current supplied to the torque motor in the forward paging.

When a plurality of users simultaneously use the search unit 2000, the speed at which the image data is obtained is slower than that when the search unit is occupied by one user. If the designated display interval is longer than the transfer speed of one-page image data, no problem will arise. Otherwise, it is possible that the image data to be displayed is not yet sent to the temporary image memory 1800. For example, during the paging at the display interval of $T_{S2}$, if the image data of the next page is absent in the expanded image data memory 1200, the torque motor is driven to return the lever 530 to $\theta$, so that the data transmission conforms to the current image transfer interval $T_{S1}$ (content of the register C). FIG. 16 shows the current applied to the torque motor 502 in the forward paging. An abscissa t represents a time and an ordinate I represents the current. At a time $t_1$, a pulse for indicating an end of one-page display is generated. At a time $t_2$, the current is generated to return the lever 530 because the data for the next page is absent in the expanded image data memory 1200. At a time $t_3$, the lever 530 is returned and the current is lowered.

In accordance with the present embodiment, the apparatus status, that is, the end of one-page output and the presence or absence of waiting time are informed by the tactile signal. Thus, the user can recognize what sheets of page are sent without watching the screen and detect the current state of the image identification number memory by feeling reverse rotation of the lever which the user pushes by his/her finger. Accordingly, the user who expected high speed paging can recognize the current status and wait for the paging with less irritation.

In the present embodiment, the torque of the rotary lever is used to generate the tactile signal, although a pressure of a piston motion lever or vibration of a sliding switch may be used. The status of the processor may be indicated to the user by other than the tactile signal. For example, a pulsive sound may be generated for each page, and a tone of the sound may be changed in the backward paging.

In accordance with the present invention, when a desired image is to be retrieved by visually checking a number of images one by one, less pertinent images can be paged at a high speed and more pertinent images are paged at a low speed one by one. When a number of images are displayed at the high speed, the boundary of the page is indicated to the user by the tactile signal or other means so that the user can readily recognize the paging speed. This also serves as a synchronization signal to visually check the images one by one. In the backward paging, the display is done in the time reversal manner to the forward paging so that the user can readily recognize the direction of paging. Those functions impart to the user the same feeling as that which the user feels in manually paging paper documents. When one image storage unit is simultaneously used by a plurality of users, the delay of response can be indicated to the users.

The tactile method for indicating the end of one-page display and the waiting time to the user may be applied to a processor other than image display in order to indicate the internal status of the processor to the user.

What is claimed is:

1. An image display apparatus for paging images on a display screen, comprising:
   memory means for storing a plurality of page images with image identification numbers;
   display means for sequentially reading the page images from said memory means and for sequentially displaying the page images on a display by paging so that each page image replaces another page image on the display by successive line scanning with a specified display interval time;
   display speed control means for specifying a display interval time per page image and the direction of paging;
   timer means for measuring the elapsed display time per page; and
   means for continuously sampling the display interval time specified by said display speed control means and for comparing a sampled value of display interval time with the elapsed display time measured by said timer means to continuously control the paging by said display means based on the results of said comparing.

2. An image display apparatus according to claim 1 further comprising tactile feedback means for conveying to a user a feedback signal synchronized with the sequential display of said page images.

3. An image display apparatus according to claim 2 wherein said tactile feedback means conveys to users an indication of the amount of waiting time when the response time is to be greater than an expected response time.

4. An image display apparatus according to claim 1 wherein said display means includes means, responsive to the display interval time designated by the user by said display speed control means being shorter than a time required to display a one-page image, for terminating the display of a page image midway so that the page image is displayed within the specified display interval time and for then initiating the display of the next page image.

5. An image display apparatus according to claim 2 wherein said display means includes means responsive to said display speed control means for controlling said paging according to the specified direction of paging to effect said successive line scan from top to bottom of the display for forward paging and from bottom to top of the display for backward paging, and said tactile feedback means conveys the feedback signal for backward paging in a time reversal manner to that conveyed for forward paging.

6. An image display apparatus according to claim 1 further comprising a large capacity image storage, a random access high speed image buffer, and processing means for reading images from said large capacity image storage and writing them into said image buffer and for displaying the image data written in said image buffer in accordance with an instruction by a user, said reading and displaying being performed in parallel.

7. An image display apparatus according to claim 1, wherein said display means includes means responsive to said display speed control means for controlling said paging according to the specified direction of paging to effect said successive line scan from top to bottom of the display for forward paging and from bottom to top of the display for backward paging.

* * * * *